(12) United States Patent
Baasch et al.

(10) Patent No.: US 7,252,184 B2
(45) Date of Patent: Aug. 7, 2007

(54) TRANSFER GEARBOX

(75) Inventors: Detlef Baasch, Friedrichshafen (DE); Ulrich Mair, Friedrichshafen (DE); Christoph Pelchen, Tettnang (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 248 days.

(21) Appl. No.: 11/080,235

(22) Filed: Mar. 15, 2005

(65) Prior Publication Data
US 2006/0207854 A1   Sep. 21, 2006

(30) Foreign Application Priority Data
Mar. 20, 2004   (DE) ............... 10 2004 014 150

(51) Int. Cl.
   *B60K 17/346* (2006.01)
(52) U.S. Cl. ............... 192/48.2; 192/48.8; 192/84.6; 192/84.7
(58) Field of Classification Search ............. None
   See application file for complete search history.

(56) References Cited

U.S. PATENT DOCUMENTS

| 4,895,236 | A | * | 1/1990 | Sakakibara et al. | ........ 192/84.6 |
| 5,199,325 | A | * | 4/1993 | Reuter et al. | ................. 74/335 |
| 5,234,072 | A | | 8/1993 | Chludek | |
| 5,246,408 | A | * | 9/1993 | Kobayashi | ................. 475/221 |
| 5,248,284 | A | * | 9/1993 | Kobayashi et al. | ........... 475/86 |
| 5,690,002 | A | | 11/1997 | Showalter | |
| 6,783,475 | B2 | | 8/2004 | Gazyakan et al. | |
| 2002/0100657 | A1 | | 8/2002 | Vonnegut et al. | |
| 2003/0051935 | A1 | | 3/2003 | Mori et al. | |

FOREIGN PATENT DOCUMENTS

| DE | 1 737 226 | 1/1957 |
| DE | 41 22 126 C2 | 9/1994 |
| DE | 197 08 968 A1 | 10/1997 |
| DE | 100 58 198 A1 | 6/2002 |
| JP | 63312234 A * | 12/1988 |

* cited by examiner

*Primary Examiner*—Richard M Lorence
(74) *Attorney, Agent, or Firm*—Davis Bujold & Daniels, P.L.L.C.

(57) ABSTRACT

A transfer case (12) for distributing a driving torque of an input shaft (19) between two drivable output shafts (22, 29) is described. The transfer case (12) is realized with two controllable and adjustable frictionally engaged clutches (k_VA, k_HA), which are arranged between the input shaft (19) and the output shafts (22, 29) and whose transfer capabilities can be respectively adjusted via separate actuating devices (10, 11). A driving torque can be distributed between the drivable output torques (22, 29) in dependence upon the set transfer capabilities of the clutches (k_VA, k_HA). One clutch (k_HA) can also be radially enclosed by the other clutch (k_VA).

14 Claims, 7 Drawing Sheets

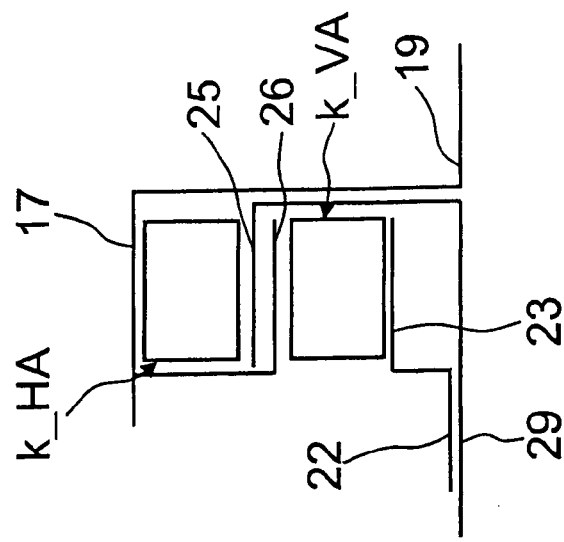
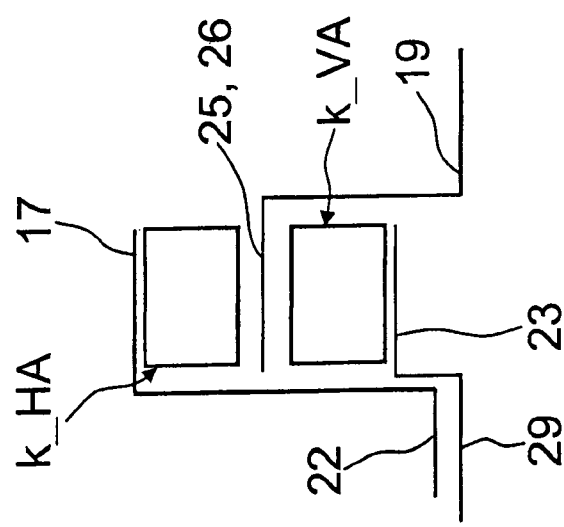
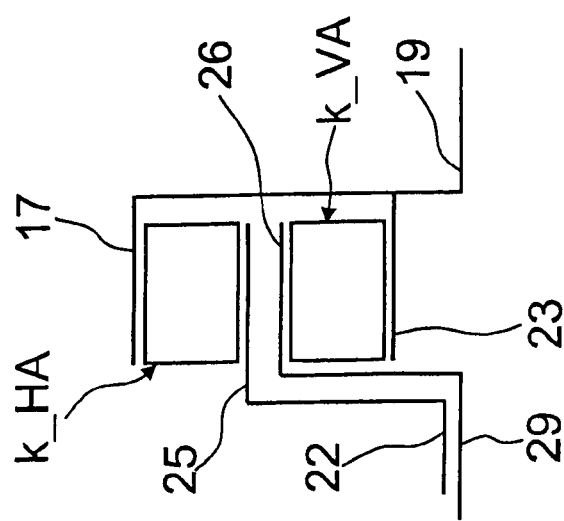

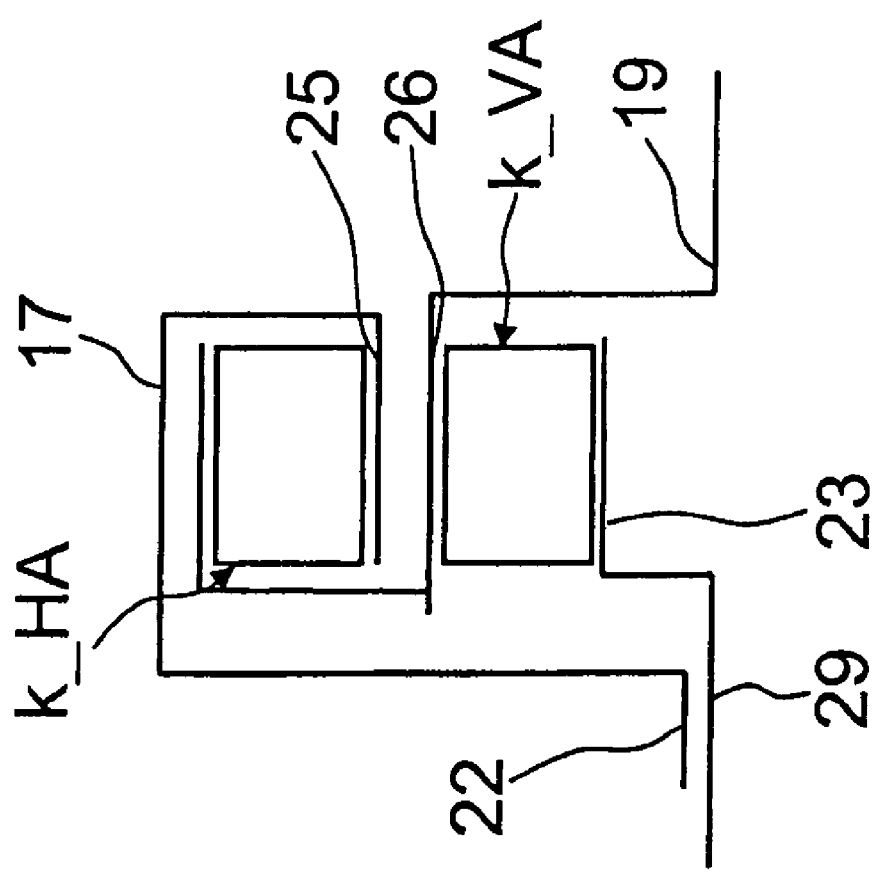

TRANSFER GEARBOX

This application claims priority from German Application Ser. No. 10 2004 014150.9 filed Mar. 20, 2004.

FIELD OF THE INVENTION

The invention concerns a transfer case for distributing a driving torque of an input shaft between two drivable output shafts.

BACKGROUND OF THE INVENTION

The vehicle power trains known from practice are usually realized in such a way that a driving torque generated by a driving motor can be guided, as needed, to the driving wheels via a gear device. In vehicles with several drivable vehicle axles, such as cars or trucks with all-wheel drive, the output of the driving motor is distributed in the power train of the vehicle to the individual vehicles axles and the different driving wheels of the vehicle axles.

The power distribution described above generally takes place via a transfer case or differential gear wherein longitudinal differential gears seen in the direction of travel are used for the longitudinal distribution of the driving power of the driving motor to several driven vehicle axles. So-called transverse differentials or balancing differentials are provided for a transverse distribution of the driving power to the driving wheels of a vehicle axle with reference to the direction of travel of a vehicle.

Conventional designs of differential gears are the bevel gear differentials, spur gear differentials with a planetary design or also worm gear differentials. Especially the aforementioned spur gear differentials are mostly used as longitudinal differentials because of the possibility of an asymmetrical torque distribution. Meanwhile the bevel gear differentials have become the standard for a transverse compensation in vehicles. Worm gear differentials are used for longitudinal distribution as well as for transverse distribution.

In these differential-controlled all-wheel drives or all-wheel systems known from the practice, the torque distribution to the front and rear axle occurs via a planetary gear differential or a bevel gear differential. The driving torque can be distributed as desired to the two driving axles or vehicle axles by selecting the gear ratio with the planetary gear differentials. The customary torque distributions between the front and rear axle are between 50%:50% and 33%:66%. In bevel gear differentials, the torque distribution is almost at 50%:50%. The torque distribution is ideal only for one point, the design point, due to the selection of a fixed torque ratio between the front and rear axle.

Consequently, the driving torque is not distributed in proportion to the axle load that corresponds to the present driving condition. If the traction reserves are to be utilized in their entirety when there is high slip, which is theoretically only possible with variable torque distribution between the front and rear axle; the longitudinal differential can be stopped or blocked. The vehicle performance is not negatively influenced by a continuously started locking effect caused by an increasing rotational speed difference, for example, via a viscous clutch and a permanent faulty gripping in the power train, such as can occur in positive locks, is prevented.

The previously described concepts, however, for the distribution of a driving torque of an input shaft between two drivable drive shafts have the disadvantage that they require a large installation space and, therefore, are difficult to integrate into the current gearbox plans.

It is, therefore, an objective of the invention to make a transfer case available having such a low requirement of installation space that the transfer case can be easily integrated in the existing gearbox plans and a torque distribution can be carried out by way of the transfer case, as needed, and dependent upon the operating condition between at least two drivable output shafts.

This objective is achieved with a transfer case in accordance with the features of patent claim 1.

SUMMARY OF THE INVENTION

A variable distribution of the driving torque between the two drivable output shafts can be carried out, according to the invention, with the transfer case for distributing a driving torque of an input shaft between two drivable output shafts, which is realized with two controllable and adjustable frictionally engaged clutches, which are arranged between the input shaft and the output shafts and whose transfer capabilities can be respectively adjusted via separate actuating devices.

This is achieved in that the driving torque can be distributed between the drivable output shafts dependent upon the infinitely variable transfer capability of the clutches.

The transfer case, according to the invention, is further characterized by a small installation space requirement, since one of the clutches is radially enclosed by the other clutch. A transfer case, realized in such a way, requires little installation space particularly in axial direction and can be arranged also in areas, such as between a main gearbox of a power train of a vehicle and further power conducting units of a power train of a motor vehicle in which only little installation space is available.

In addition, the telescoping arrangement of the two frictionally engaged clutches offers the possibility of realizing the clutch in a predominantly irregular distribution of the driving torque of the input shaft between the two output shafts of the transfer case, via which large torque values are to be transmitted, as the "external" clutch in order to reduce the external measurements of the transfer case and the other clutch, via which smaller torque values are to be transmitted as "internal" clutch.

BRIEF DESCRIPTION OF THE DRAWINGS

The invention will now be described, by way of example, with reference to the accompanying drawings in which:

FIGS. 5a to 5g show seven different possibilities for an effective connection between the input shaft and the two clutches, as well as between the output shafts and the clutches.

DETAILED DESCRIPTION OF THE INVENTION

Figure 1:
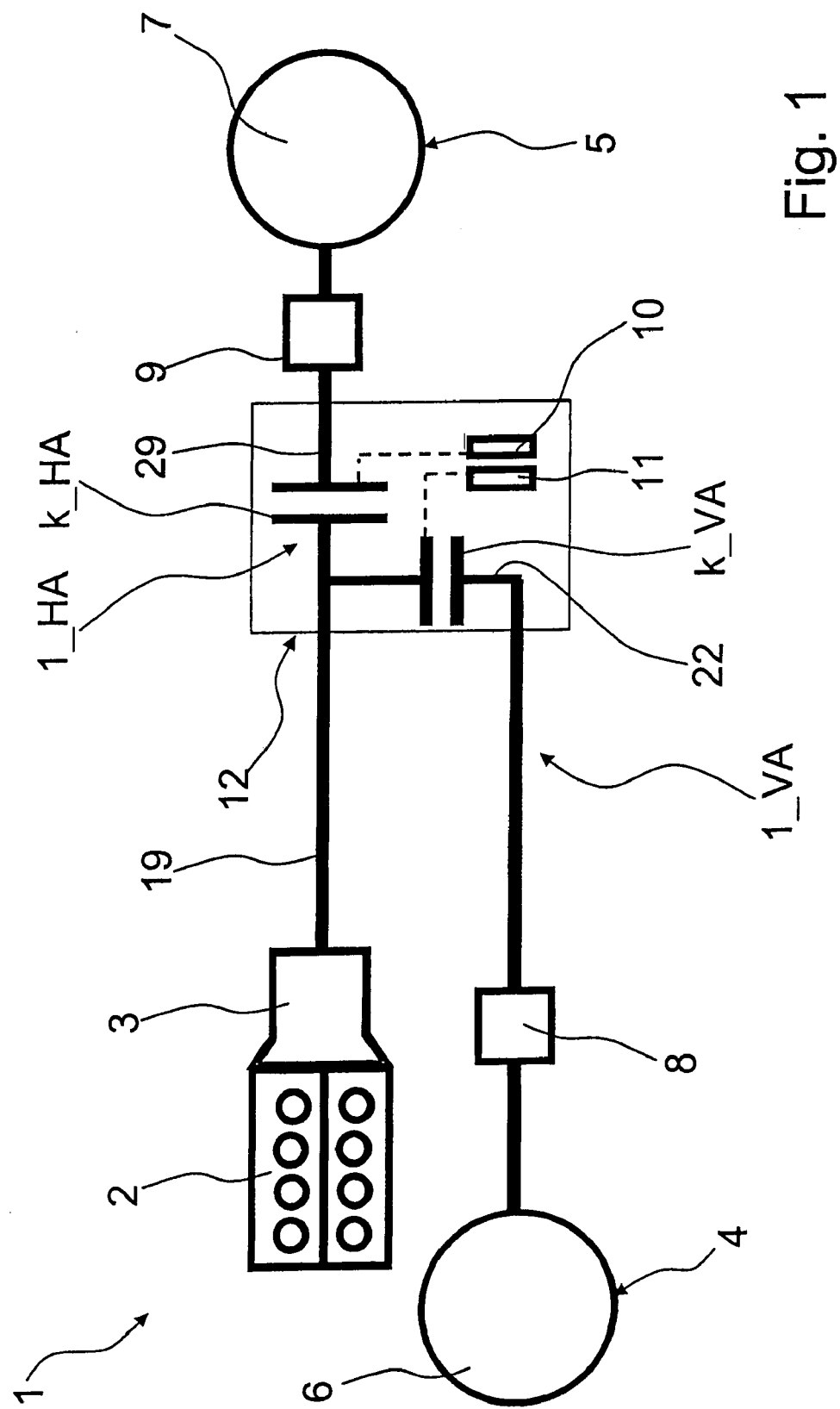
FIG. 1 shows a highly schematized depiction of a power train of a vehicle.

FIG. 1 shows a power train 1 of a vehicle with all-wheel drive in a highly schematized representation. The power train 1 comprises a drive unit or an internal combustion engine 2 and a main gearbox 3, which can be any of the gearboxes known from practice.

Two clutches k_HA and k_VA are arranged in longitudinal power trains 1_HA and 1_VA between the main gearbox 3, which is provided in order to represent different gear ratios and two drivable vehicle axles 4, 5 of the vehicle, which are connected in a known way at each side of the vehicle to at least one driving wheel 6, 7. The clutches k_HA and k_VA are arranged between the main gearbox 3 and devices 8, 9 for compensating for the rotational speed differences between the driving wheel 6 of the vehicle axle 4 and the driving wheel 7 of the vehicle axle 5 wherein the devices 8, 9 are realized as well-known crossover transfer cases. The portion of the driving torque supplied to the driving axles 4 and 5, respectively, is transferred via the devices 8, 9 to the driving wheels 6 and 7 and distributed, as needed, between the driving wheel 6 or 7 of the corresponding driving axle 4 or 5.

The two crossover transfer cases 8 and 9 offer the possibility of driving the driving wheels 6 and 7 of the driving axles 4 and 5 independently from each other at different rotational speeds in accordance with the different covered distance of the left or right lane, whereby the driving torque can be distributed symmetrically and consequently free of yawing moments between two driving wheels 6 or 7 of a vehicle axle 4 or 5.

Figure 2:
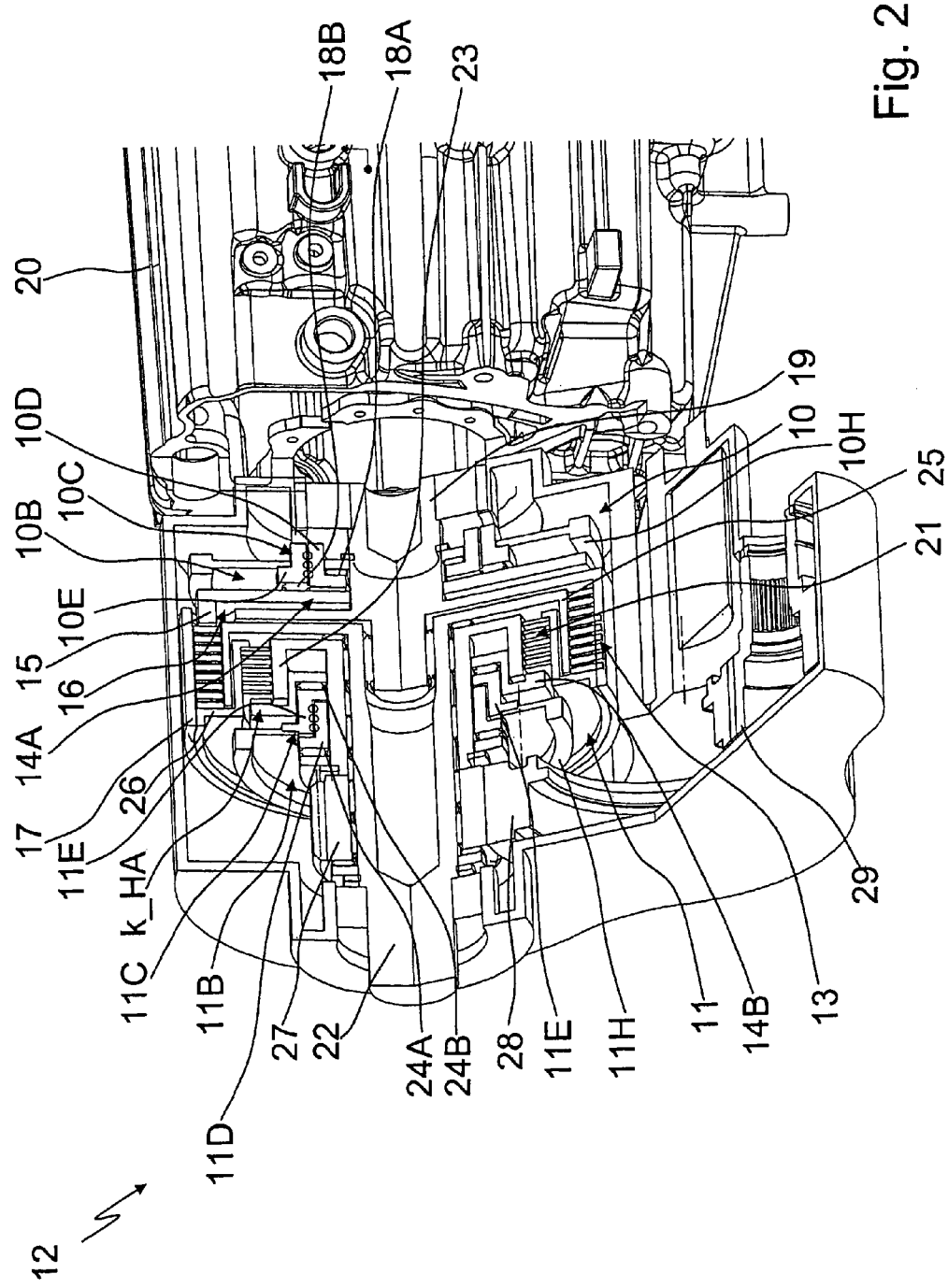
FIG. 2 shows a three-dimensional partial sectional view of a transfer case realized in accordance with the invention.
Figure 3:
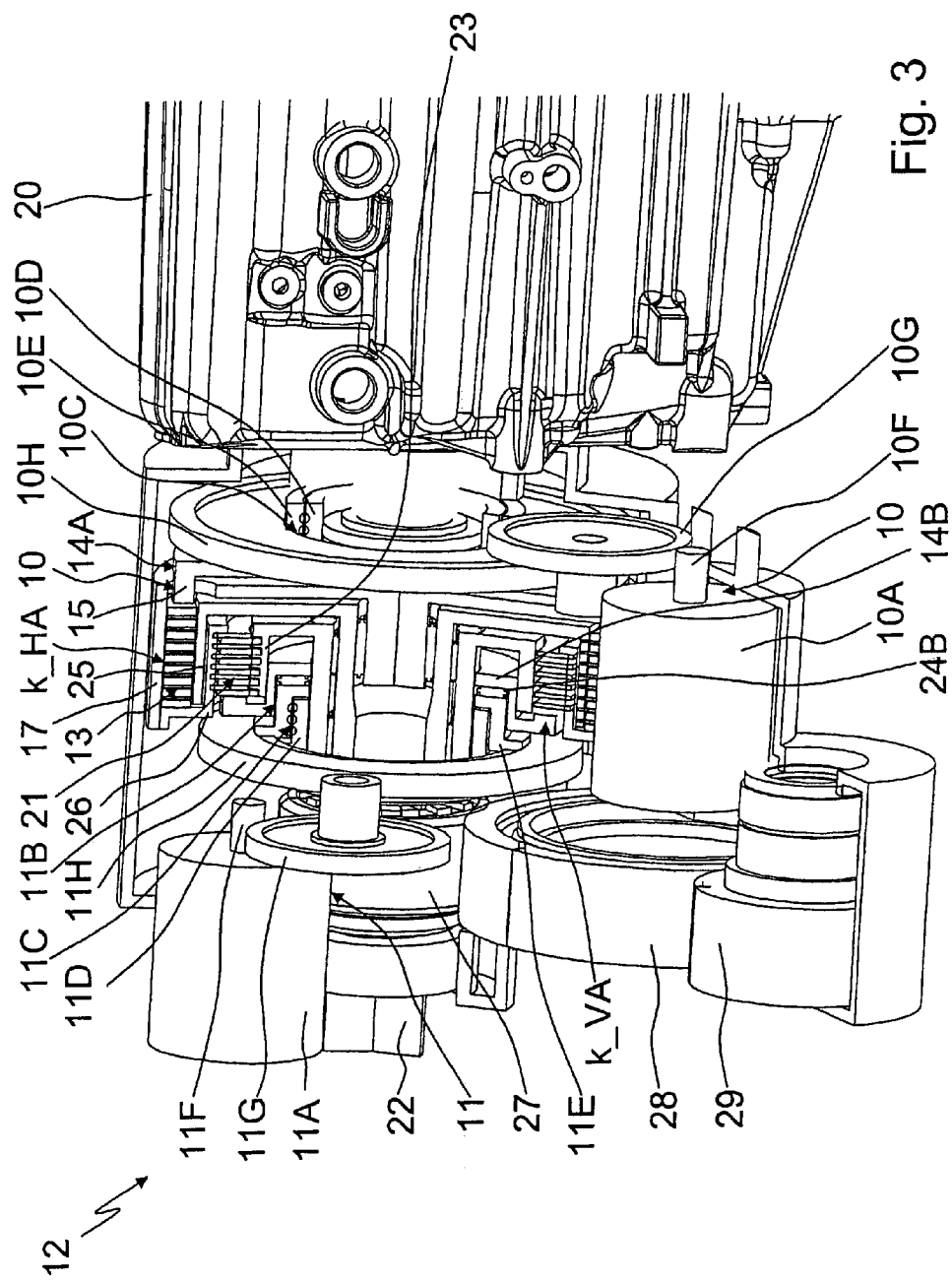
FIG. 3 shows a transfer case according to FIG. 2 in a further three-dimensional partial sectional view.

The two clutches k_HA and k_VA are realized herein as controllable and adjustable frictionally engaged multiple disc clutches, whose transfer capabilities can be set via actuating devices 10, 11 shown in FIGS. 2 and 3, and which are arranged in the area of a gearbox output of a transfer case 12 shown merely schematically in FIG. 1. It is possible with the clutches k_HA and k_VA to distribute a driving torque of the driving motor 2 or a gearbox output torque of the main gearbox 3 variably and as needed in the longitudinal direction of the vehicle between the two drivable vehicle axles 4, 5.

The drive of the two clutches k_HA and k_VA, as well as the distribution of the applied driving torque resulting therefrom on the two vehicle axles 4 and 5, is explained in more detail with reference to the illustration in FIG. 4.

Figure 4:
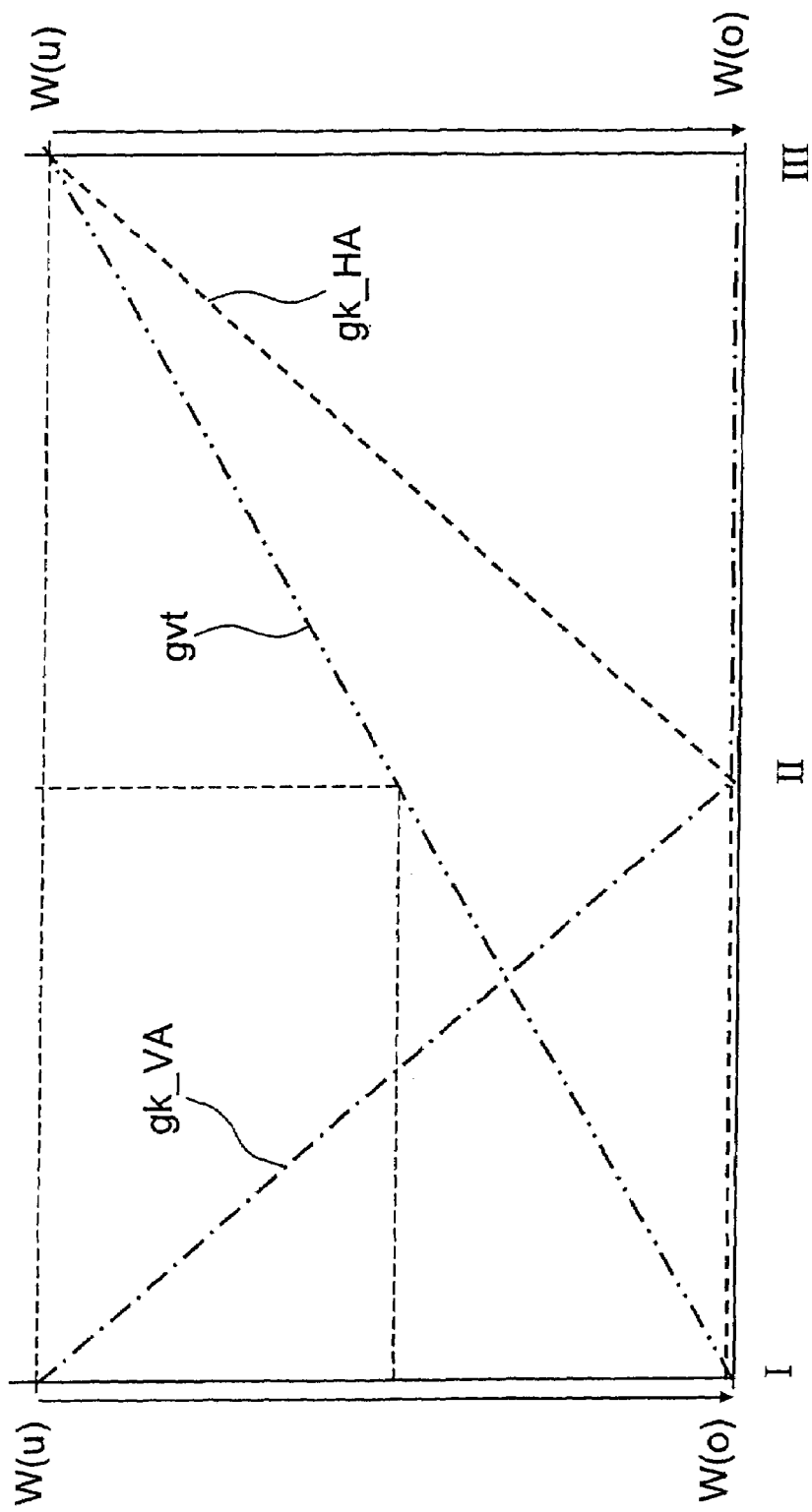
FIG. 4 shows a graphic depiction of an interrelation between the transfer capabilities of the clutches of the power train in accordance with FIG. 1 and a degree of distribution of the driving torque between two drivable vehicle axles of the power train.
Figure 5F:
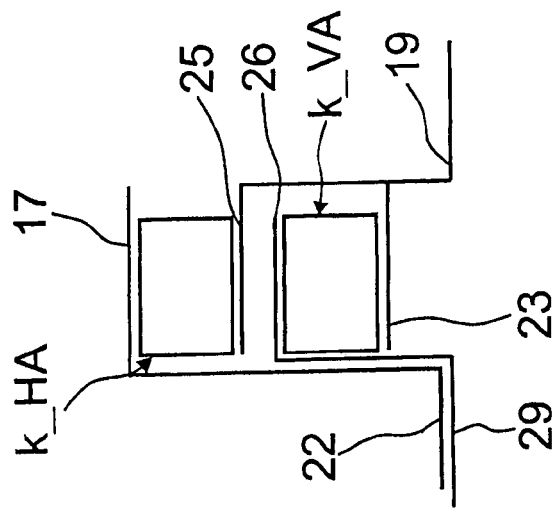
Figure 5E:
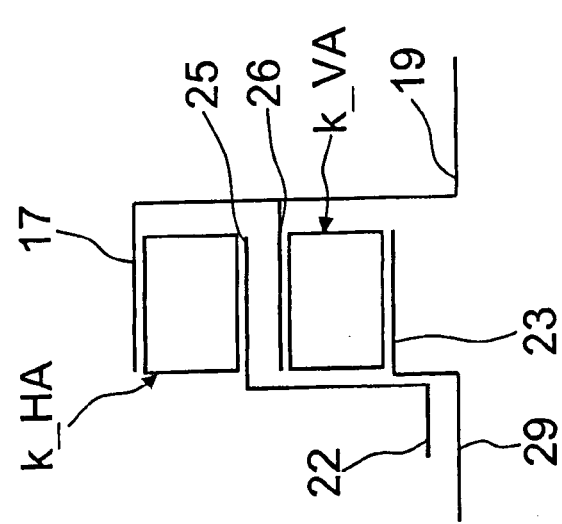
Figure 5D:
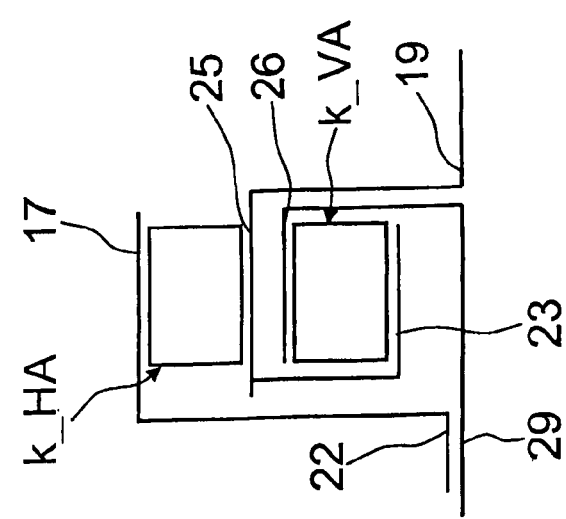

FIG. 4 shows three highly schematized courses of which a first course gk_VA represents a sequence of a transfer capability of the first clutch k_VA between a lower limit value W(u), and an upper limit value W(o). A further course gk_HA represents the course of the transfer capability of the second clutch k_HA, which corresponds to course gk_VA of the first clutch k_VA. A third course gvt graphically represents the course of a degree of distribution of the driving torque between the two vehicle axles 4 and 5, wherein the vehicle axle 4 herein represents the front axle (VA), and the vehicle axle 5 represents the rear axle (HA) of a vehicle with all-wheel drive.

Essentially no torque is transmitted via the first clutch k_VA at point I, at which the transfer capability of the first clutch k_VA corresponds to the lower limit value W(u). At the same time, the transfer capability of the second clutch k_HA is set to the upper limit value W(o), at which the second clutch k_HA is in a synchronous condition and no slip occurs between the two clutch halves of the second clutch k_HA. In this operating condition of the two clutches k_VA and k_HA, the whole driving torque of the driving motor 2 is supplied to the rear axle 5.

In the area between point I and a second point II of the diagram according to FIG. 4, the transfer capability of the second clutch k_HA is set in such a controlled and adjusted manner that the clutch k_HA remains in its synchronous condition. At the same time, the transfer capability of the first clutch k_VA is changed from its lower limit value W(u), in which it does not transfer any torque, in the direction of the upper limit value W(o) of the transfer capability, at which the first clutch k_VA is, likewise, in its synchronous condition. This means that the transfer capability of the first clutch k_VA is constantly increased in the area between point I and point II. As a consequence, the degree of distribution of the driving torque changes between the two vehicle axles 4 and 5, since with an increasing transfer capability of the first clutch k_VA, an increasing portion of the driving torque is supplied to the front vehicle axle 4.

If an operating condition of the power train 1 that corresponds to the point II of the diagram according to FIG. 4 is present and in which both clutches k_VA, and k_HA are in synchronous condition, there is a defined degree of distribution of the driving torque between the two vehicle axles 4 and 5.

In an area between the second point II and a third point III of the diagram, according to FIG. 4, the transfer capability of the first clutch k_VA is set in such a controlled and adjusted manner that the first clutch k_VA is kept in its synchronous condition. At the same time, the transfer capability of the second clutch k_HA is continuously reduced starting from the upper limit value W(o) of the transfer capability, at which the second clutch k_HA is synchronous in the direction toward the lower limit value W(u) of the transfer capability, at which the second clutch k_HA essentially no longer transfers any torque in the direction of the rear vehicle axle 5.

As can be seen in FIG. 4, the course gvt of the degree of distribution of the driving torque rises between the vehicle axles 4 and 5 with increasing reduction of the transfer capability of the second clutch k_HA up to its maximum value at point III, at which the driving torque is transferred entirely to the front axle 4.

By means of the two controllable and adjustable clutches k_HA, and k_VA, it is possible to distribute the driving torque of the internal combustion engine 2 or the gearbox output torque of the main gearbox 3 as needed, continuously and with an optimized degree of effectiveness between the vehicle axles 4 and 5. An improvement of the degree of effectiveness is achieved by way of the previously described procedure with the control and adjustment of the two clutches since one of the two clutches k_VA, or k_HA is constantly operated free of slip, while the other clutch k_HA, or k_VA is operated with a rotational speed difference that corresponds to the driving power distribution that is dependent on the operation situation in the power train. The friction losses can be minimized by way of this operating strategy with all the advantages of a clutch-controlled all-wheel drive.

By using the two controllable and adjustable clutches k_VA, k_HA in the transfer case 12, it is also possible to advantageously realize the main gearbox 3 without a separate startup element, such as a hydrodynamic torque converter or a frictionally engaged startup clutch or without having to integrate a startup element as additional component into the power train, since either one of the two clutches k_VA, or k_HA or both clutches k_VA and k_HA can take over the function of a startup element.

If the main gearbox 3 is realized as an infinitely variable gearbox having a chain variator, it is possible to advantageously adjust the startup gear transmission ratio of the variator when the vehicle is at a standstill, since the output of the vehicle at a standstill with open clutches k_VA, and k_HA is separated from the main gearbox 3.

An optimal influencing of the driving dynamic, the traction, as well as the stability of a vehicle designed with the power train, according to the invention, is furthermore ensured as a result of the realization of the power train 1, according to the invention, with the two clutches k_VA and k_HA and the power train can also be realized with a lower weight as compared to the solutions known from practice.

The two actuating devices 10, 11 can be seen in more detail in the highly schematized transfer case 12 shown in the partial sectional views of FIG. 1, which are depicted in more detail in FIGS. 2 and 3. Each of the actuating devices 10, 11 is realized with an electric motor 10A, 11A as actuator, whose rotary driving motion can be converted in each case by way of a converter device 10B, 11B into a linear actuating motion for the clutches k_VA and k_HA. The two electric motors can be arranged in the interior of a housing 20 of the transfer case 12, as well as also outside of the housing 20. In each case, the converter devices 10B, 11B have a ball screw 10C, 11C, which is formed, in turn, in each case by a threaded spindle 10D or 11D and a screw nut 10E or 11E.

In a deviation from the previously described realization of the two actuating devices 10 and 11 of the transfer case 12 having the ball screws 10C and 11C, it is provided in a further embodiment of the transfer case 12 (not shown in further detail), that the rotary drive of the electric motors 10A and 11A is converted in each case via a conventionally designed ball ramp unit arranged upstream of the clutches k_VA and k_HA into a translatory actuating motion for the clutches k_VA, and k_HA.

In order to change the transfer capability of the second clutch k_HA arranged in the longitudinal power train 1_HA between the main gearbox 3 and the drivable vehicle axle 5 or the rear axle, the electric motor 10A of the actuating device 10 is supplied with electric current. A rotation of the electric motor 10A is transferred from an output shaft 10F of the electric motor 10A via a first stepped intermediate wheel 10G and a second intermediate wheel 10H having a predefined overall gear ratio toward the screw nut 10E of the converter device 10B assigned to the second clutch k_HA, wherein the screw nut 10E can be positively and frictionally connected to the second intermediate wheel 10H.

As a result of the effective connection realized as ball screw 10C between the threaded spindle 10D and the screw nut 10E, a rotation of the screw nut 10E leads to a translatory displacement of the screw nut 10E toward the threaded spindle 10D in the direction of a disk pack 13 of the second clutch k_HA or away therefrom in the direction of a gearbox input of the transfer case 12. This means that the screw nut 10E of the converter device 10B assigned to the second clutch k_HA is movably arranged, rotationally, as well as also fixed in axial direction, dependent on the predetermined thread pitch of the ball screw 10C on the threaded spindle 10D, which is affixed in the housing 20 of the transfer case 12 and movably arranged in axial direction on an input shaft 19.

Between the screw nut 10E and the disk pack 13 of the second clutch k_HA, a so-called pressure plate 14A is arranged, via which the actuating force originating from the screw nut 10E is transferred onto the disk pack 13 of the second clutch k_HA in the closing direction of the second clutch k_HA. The pressure plate 14A of the converter device 10B is herein realized with several finger elements 15 arranged preferably with a symmetrical distribution with which the pressure plate 14A projects through openings 16 of an exterior disk support 17 of the second clutch k_HA in the direction of the disk pack 13 and via which the actuation of the clutch k_HA takes place. The pressure plate 14A is, likewise, pressed via a spring element (not shown in detail) against the screw nut 10E, so that the effective connection between the pressure plate 14A and the screw nut 10E can be realized without gaps and the pressure plate moves away from the disk pack 13 in a translatory actuating motion of the screw nut 10E in the opening direction of the disk pack 13 of the second clutch k_HA and follows the screw nut 10E.

The converter device 10B is rotationally decoupled from the other components of the transfer case 12 in the area of the ball screw 10C via two axial bearings 18A and 18B, with which an actuation of the second clutch k_HA can be realized independently from the motion of the components of the transfer case 12 that enclose the converter device 10B.

The threaded spindle 10D of the converter device 10B assigned to the second clutch k_HA is arranged in such a way between the exterior disk support 17 of the second clutch k_HA and the input shaft 19 of the transfer case 12 that the axial forces that occur as a result of the actuation of the second clutch k_HA can be reinforced in the exterior disk support 17 of the second clutch k_HA, and the input shaft 19, whereby a reinforcement of an axial force in the housing 20 of the transfer case 12 is not required.

The second actuating device 11 of the transfer case 12 provided for actuating the first clutch k_VA is realized essentially in the same way as the first actuating device 10 assigned to the second clutch k_HA. The transfer capability of the first clutch k_VA is influenced by the actuating device 11 by way of a corresponding supply of electric current of the electric motor 11A, since the rotation of the electric motor 11A, resulting from the supply of electric current of the electric motor, effects a translatory motion of the screw nut 11E, which actuates the first clutch k_VA in opening direction or closing direction. The rotary driving torque of the electric motor 11A is picked up by a further stepped intermediate wheel 11G at the output shaft 11F of the electric motor 11A and is transferred to a second intermediate wheel 11H of the converter device 11B, whereupon the last mentioned second intermediate wheel 11H can be effectively connected to the screw nut 11E of the ball screw 11C of the converter device 11B, so that a rotation of the second intermediate wheel 11H is transferred directly to the screw nut 11E.

A rotation of the screw nut 11E, which forms the ball screw 11C of the converter device 11B, together with a threaded spindle 11D, effects a translatory displacement of the screw nut 11E dependent on the direction of the rotation in the direction of a disk pack 21 of the first clutch k_VA or away therefrom in the direction of the gearbox input of the transfer case 12. The axial motion of the screw nut 11E resulting from the rotation of the electric motor 11A is effected by the threaded spindle 11D affixed in axial direction on an interior disk support 23 of the first clutch k_VA, and rotationally fixed in the housing 20 of the transfer case 12. Hereby, the threaded spindle 11D is arranged in such a way on the interior disk support 23 of the first clutch k_VA that the axial forces that occur during the actuation of the first clutch k_VA in the area of the ball screw 11C are absorbed without support in the housing 20 of the transfer case 12 by the interior disk support 23 of the first clutch k_VA.

The converter device 11B, assigned to the first clutch k_VA, is furthermore rotationally decoupled in the area of the ball screw 11C by way of two axial bearings 24A and 24B from the remaining components of the converter device 11B or the first clutch k_VA so that the mode of operation of the actuating device 11 is independent from the components of the transfer case 12 that enclose the same.

The gearbox output torque of the main gearbox 3 introduced via the input shaft 19 into the transfer case 12 is distributed via the two clutches k_VA and k_HA between the two vehicle axles 4 and 5 in the manner described in FIG. 4 depending on the transfer capabilities of the two clutches k_VA and k_HA set via the two actuating devices 10, 11. A portion of the gearbox output torque of the main gearbox 3, which is dependent upon the currently set transfer capability of the second clutch k_HA, is guided by the input shaft 19 toward the exterior disk support 17 of the second clutch k_HA and via the disk pack 13 and an interior disk support 25 toward an output shaft 22 of the transfer case 12, which is effectively connected to the second vehicle axle 5.

A portion of the gearbox output torque of the main gearbox 3, which is dependent upon the currently set transfer capability of the first clutch k_VA, is furthermore guided by the input shaft 19 of the transfer case 12 via the exterior disk support 17 of the second clutch k_HA toward an exterior disk support 26 of the first clutch k_VA, which is effectively connected thereto. Subsequently, the applied torque is guided via the disk pack 21 of the first clutch k_VA to the interior disk support 23, an intermediate gear wheel 27 and a further intermediate gear wheel 28 that meshes therewith toward a second output shaft 29 of the transfer case 12, which is effectively connected to the first vehicle axle 4.

The exterior disk support 17 of the second clutch k_HA is herein connected torque proof to the input shaft 19 of the transfer case 12 via a gear tooth system wherein it is, of course, up to the discretion of the expert to weld the exterior disk support 17 for this purpose alternatively to the input shaft 19, in order to produce a torque proof connection between these two components. The exterior disk support 17 of the second clutch k_HA is furthermore pressed together with the exterior disk support 26 of the first clutch k_VA and is, in addition, effectively connected via a gear tooth system so that the torque applied via the exterior disk support 17 of the second clutch k_HA is transferred via the gear tooth system to the exterior disk support 26 of the first clutch k_VA. Of course, it is also possible to weld together the exterior disk supports 17 and 26 of the two clutches k_HA and k_VA depending on the respective application case.

If it is desired mainly to supply a greater portion of the driving torque of the driving motor 2 to one of the two vehicle axles 4 or 5 of the vehicle, the clutch k_HA or k_VA assigned to the vehicle axle 4 or 5 to be fed with the greater portion of driving torque is more highly loaded than the respective other clutch k_VA, or k_HA. In order to be able in such a case to make a transfer case 12 available having a compact design, it is advantageous if the more highly loaded clutch k_HA, or k_VA radially encloses the clutch k_VA, or k_HA, which is less highly loaded. A smaller covering width of the disks of the concerned disk pack is required in order to achieve the required effective surface of the more highly loaded clutch k_VA, or k_HA than would be the case with the internal clutch, in which a considerably larger covering width is to be provided in order to achieve the same transfer capability as that of the external clutch, because of the greater diameter of the external clutch. The measurements of the transfer case 12 can be optimized therewith in the radial direction as well as also in the axial direction, while taking into consideration the specifications, which are conditional upon the design.

The two electric motors 10A and 11A of the actuating devices 10, and 11 can herein be controlled, and adjusted independently from each other, wherein the two electric motors 10A and 11A can be controlled and adjusted via a control device of the power train depending on the most different specifications, as well as a current operating condition of the vehicle.

As an alternative to the mechanical drive of the two clutches k_VA and k_HA shown in the drawing, of course, it is possible to set the transfer capability of the clutches via hydraulic actuating devices, wherein the hydraulic control and regulator circuit of the actuating devices having a hydraulic design for setting the transfer capability of the clutches of the transfer case 12 can be either integrated in the hydraulic control circuit of the main gearbox 3 of the power train 1, or connected thereto or can be realized respectively as separate or stand-alone systems.

In the realization as electric motor or in the hydraulic realization of the actuating devices, the needed startup force is applied during the operation of the transfer case 12 to drive the two clutches k_HA and k_VA either by means of a constant supply of electric current to the electric motors or by means of a constant maintenance of the hydraulic drive pressure. Since this can lead to an overload of the electric motors in some instances or can have as a consequence a low degree of effectiveness of the hydraulically designed actuating devices because of leakage losses, the converter devices of the two clutches k_VA, and k_HA can each be realized with a mechanical locking device, which actuates the two clutches k_HA, and k_VA with the respectively currently set axially acting actuation force without drive force from the side of the actuating device. The locking devices can have a magnetic, mechanic or friction engaged design, wherein a locking device with a friction engaged realization can be, for example, a brake which secures the actuating device of a clutch with respect to the housing 20 of the transfer case 12.

The previously described realization of the actuating devices 10 and 11 having transmission levels arranged between the electric motors 10A and 11A and the ball screws 10C and 11C, which are formed by the stepped intermediate wheels 10G and 11G, as well as the second intermediate wheel 10H and 11H, offers the possibility of transforming the driving torques of the electric motors 10A and 11A in the desired way. Moreover, the gear ratios of the actuating devices 10 and 11 are realized depending on the respective application case to the effect that the transfer capabilities of the two clutches k_VA and k_HA can be changed with short reaction times or that a high actuating force is available in each case for controlling and adjusting the two clutches k_VA and k_HA in the area of the pressure plates of the actuating devices.

In a further development of the transfer case, according to the invention (not shown in detail), the second intermediate wheels connected respectively to the screw nuts of the converter devices assigned to the clutches k_HA and k_VA are not realized as complete gear wheels, but as gear segments. Thus, the converter devices require less space and the total weight of the transfer case is reduced with respect to the realization of the converter devices with complete second intermediate wheels.

FIGS. 5a to 5g show seven different highly schematized arrangement possibilities for the two clutches k_VA and k_HA, which differ in the linkage of the exterior disk support 17, 26, and the interior disk support 23, 25 of the clutches k_VA and k_HA, as well as in the torque guidance from the input shaft via the disk supports to the two output shafts 22, 26. The disk supports of the two clutches k_VA and k_HA, which are connected to the input shaft 19 of the transfer case 12, are respectively connected torque proof to each other in each of the embodiments.

REFERENCE NUMERALS

1 Power train
2 Driving motor
3 Main gearbox
4 Drivable vehicle axle, front axle
5 Drivable vehicle axle, rear axle
6 Driving wheel
7 Driving wheel
8 Crossover transfer case
9 Crossover transfer case
10, 11 Actuating device
10A, 11A Electric motor
10B, 11B Converter device
10C, 11C Ball screw
10D, 11D Threaded spindle
10E, 11E Screw nut
10F, 11F Output shaft of electric motor
10G, 11G Stepped intermediate wheel
10H, 11H Second intermediate wheel
12 Transfer case
13 Disk pack of clutch k_HA
14A, 14B Pressure plate
15 Finger elements
16 Recesses
17 Exterior disk support of clutch k_HA
18A, 18B Axial bearing
19 Input shaft
20 Housing
21 Disk pack of clutch k_VA
22 Output shaft
23 Interior disk support of clutch k_VA
24A, 24B Axial bearing
25 Interior disk support of clutch k_HA
26 Exterior disk support of clutch k_VA
27 Intermediate gear wheel
28 Further intermediate gear wheel
29 Second output shaft of transfer case
k_VA First clutch
k_HA Second clutch
1_VA Longitudinal power train
1_HA Longitudinal power train
gvt Course of degree of distribution
gk_VA Course of the transfer capability of the first clutch
gk_HA Course of the transfer capability of the second clutch
W(u) Lower limit value of transfer capability of clutches
W(o) Upper limit value of transfer capability of clutches
HA Rear axle
VA Front axle

The invention claimed is:

1. A transfer case (12) for distributing a driving torque of an input shaft (19) between a first and a second drivable output shafts (22, 29), the transfer case (12) comprising a first and a second controllable and adjustable frictionally engaged clutches (k_VA, k_HA) U each being arranged between the input shaft (19) and the respective first and second drivable output shafts (22, 29) and whose transfer capabilities can be independently adjusted via separate actuating devices (10, 11), a driving torque can be distributed between the two drivable output shafts (22, 29) in dependence upon set transfer capabilities of the clutches (k_VA, k_HA) and a first clutch (k_VA) is radially enclosed by a second clutch (k_HA).

2. The transfer case of claim 1, wherein the clutches (k_VA, k_HA) are multiple disk clutches in which disk supports (17, 26), which are effectively connected with the input shaft (19) of the clutches (k_VA, k_HA), are one or more of positively and frictionally connected to each other.

3. The transfer case of claim 2, wherein at least one effective connection between one of the output shafts (22 or 29) and one of the disk supports (17 or 26) of one of the clutches (k_VA or k_HA) is realized on a side of the clutch (k_VA or k_HA) facing toward an effective connection between the clutch (k_VA or k_HA) and the input shaft (19).

4. The transfer case of claim 2, wherein at least one effective connection between one of the output shafts (22 or 29) and one of the disk supports (17 or 26) of one of the clutches (k_VA or k_HA) is realized on a side of the clutch facing away from an effective connection between the clutch (k_VA or k_HA) and the input shaft (19).

5. The transfer case of claim 1, wherein the actuating devices (10, 11) each have an electric motor (10A, 11A), whose rotary driving motions can be converted in each case by means of a converter device (10B, 11B) into a translatory actuating motion for the clutches (k_VA and k_HA).

6. The transfer case of claim 5, wherein at least one of the converter devices (10B, 11B) is a ball screw (10C, 11C), which has a threaded spindle (10D, 11D) and a screw nut (10E, 11E).

7. The transfer case of claim 6, wherein the threaded spindle (10D, 11D) of the ball screw (10C, 11C) is arranged in such a way that introduction of a force into a housing (20) of the transfer case (12) does not take place during an actuation of the clutch (k_HA or k_VA) assigned to the ball screw (10C, 11C).

8. The transfer case of claim 5, wherein each of the converter devices (10B, 11B) is rotationally decoupled from the clutches (k_HA, k_HA) via two axial bearings (18A, 18B and 24A, 24B).

9. The transfer case of one of the claims 5, wherein a pressure plate (14A, 14B), which is mounted on the disk support (17, 26) of the clutch (k_HA, k_VA) is provided in each case between the converter devices (10B, 11B) and the clutches (k_HA, k_VA).

10. The transfer case of one of the claims 5, wherein a transfer device is provided between one of the converter devices (10B, 11B) and the electric motor (10A, 10B) of the actuating device (10, 11).

11. The transfer case of claim 10, wherein the transfer device is an intermediate wheel (10H, 11H) that is effectively connected to the converter device (10B, 11B), and has one of a stepped intermediate wheel (10G, 10H) or gear segment engaging therewith, which engages with a tooth profile of an output shaft (10F, 11F) of the electric motor (10A, 11A).

12. The transfer case of claim 10, wherein a gear ratio of the transfer device is provided in such a way that a driving torque of the electric motor (10A, 11A) is reinforced.

13. The transfer case of claim 9, wherein the disk support (17) is realized with recesses (16), which can be punched through by finger elements (15) of the pressure plate (14A) in order to actuate the clutch (k_HA).

14. A transfer case (12) for distributing a driving torque of an input shaft (19) between a first and a second drivable output shafts (22, 29), the transfer case (12) comprising:
- a first controllable and adjustable frictionally engaged clutch (k_VA) arranged between the input shaft (19) and the first drivable output shaft (22);
- a second controllable and adjustable frictionally engaged clutch (k_HA) arranged between the input shaft (19) and the second drivable output shafts (29)
- a first actuating device (10) for controlling the first controllable and adjustable frictionally engaged clutch (k_HA) and a second actuating device (11) for controlling the second frictionally engaged clutch (k_HA); and
- wherein the first clutch (k_VA) is coaxially aligned with and radially encompassed by the second clutch (k_HA) and one of the first and second clutches (k_HA, k_VA) is constantly operated free of slip while the other of the first and second clutches (k_HA, k_VA) is operated with a rotational speed difference.

* * * * *